United States Patent
Liu et al.

(10) Patent No.: US 7,587,321 B2
(45) Date of Patent: Sep. 8, 2009

(54) METHOD, APPARATUS, AND SYSTEM FOR BUILDING CONTEXT DEPENDENT MODELS FOR A LARGE VOCABULARY CONTINUOUS SPEECH RECOGNITION (LVCSR) SYSTEM

(75) Inventors: Xiaoxing Liu, Beijing (CN); Baosheng Yuan, Singapore (SG); Yonghong Yan, Bearverton, OR (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 10/332,652

(22) PCT Filed: May 8, 2001

(86) PCT No.: PCT/CN01/00684

§ 371 (c)(1),
(2), (4) Date: May 5, 2005

(87) PCT Pub. No.: WO02/091357

PCT Pub. Date: Nov. 14, 2002

(65) Prior Publication Data
US 2005/0228666 A1    Oct. 13, 2005

(51) Int. Cl.
*G10L 15/14*    (2006.01)
(52) U.S. Cl. .................. 704/256.3; 704/256.4
(58) Field of Classification Search ............. 704/256, 704/256.3, 256.4
See application file for complete search history.

(56) References Cited

U.S. PATENT DOCUMENTS

| 5,937,384 | A | * | 8/1999 | Huang et al. ............... 704/256 |
| 6,076,056 | A | * | 6/2000 | Huang et al. ............... 704/254 |
| 6,317,712 | B1 | * | 11/2001 | Kao et al. ............... 704/256.3 |
| 6,324,510 | B1 | * | 11/2001 | Waibel et al. ............ 704/256.7 |
| 6,374,220 | B1 | * | 4/2002 | Kao .......................... 704/255 |
| 6,865,531 | B1 | * | 3/2005 | Huang ........................ 704/226 |

OTHER PUBLICATIONS

"Large-vocabulary continuous speech recognition: advances and applications", Gauvain, J.-L.; Lamel, L.;Proceedings of the IEEE vol. 88, Issue 8, Aug. 2000 pp. 1181-1200 Digital Object Identifier 10.1109/5.880079.*

* cited by examiner

*Primary Examiner*—Michael N Opsasnick
(74) *Attorney, Agent, or Firm*—Blakely, Sokoloff, Taylor & Zafman LLP

(57) ABSTRACT

According to one aspect of the invention, a method is provided in which a set of multiple mixture monophone models is created and trained to generate a set of multiple mixture context dependent models. A set of single mixture triphone models is created and trained to generate a set of context dependent models. Corresponding states of the triphone models are clustered to obtain a set of tied states based on a decision tree clustering process. Parameters of the context dependent models are estimated using a data dependent maximum a posteriori (MAP) adaptation method in which parameters of the tied states of the context dependent models are derived by adapting corresponding parameters of the context independent models using the training data associated with the respective tied states.

30 Claims, 6 Drawing Sheets

METHOD, APPARATUS, AND SYSTEM FOR BUILDING CONTEXT DEPENDENT MODELS FOR A LARGE VOCABULARY CONTINUOUS SPEECH RECOGNITION (LVCSR) SYSTEM

FIELD OF THE INVENTION

The present invention relates to the field of speech recognition. More specifically, the present invention relates to a method, apparatus, and system for building context dependent models for a large vocabulary continuous speech recognition (LVCSR) system using a context adaptation approach.

BACKGROUND OF THE INVENTION

Modern speech recognition systems are based on principles of statistical pattern recognition and typically employ an acoustic model and a language model to decode an input sequence of observations (also referred to as acoustic events or acoustic signals) representing an input speech (e.g., a sentence or string of words).to determine the most probable sentence or word sequence given the input sequence of observations. In other words, the function of a modern speech recognizer is to search through a vast space of potential or candidate sentences and to choose the sentence or word sequence that has the highest probability of generating the input sequence of observations or acoustic events. In general, most modern speech recognition systems employ acoustic models that are based on continuous density hidden Markov models (CDHMMs). In particular, CDHMMs have been widely used in speaker-independent LVCSR because they outperform discrete HMMs and semi-continuous HMMs. In CDHMMs, the probability function of observations or state observation distribution is modeled by multivariate mixture Gaussians (also referred to herein as Gaussian mixtures) which can approximate the speech feature distribution more accurately.

In practice, contextual effects can cause significant variations with respect to the way different sounds are produced. Contextual variations of sounds can be more accurately modeled using context dependent models. In other words, to achieve good phonetic discrimination, different CDHMMs have to be trained for each different context. In general, triphone models have been used as context dependent models in which every phone has a distinct HMM model for every unique pair of left and right neighbors. The use of Gaussian mixture output distribution allows each state distribution to be modeled accurately. However, when context dependent models (e.g., triphones) are used, there is a very large number of parameters to train with little or insufficient training data. One of the early approaches to deal with this problem is to tie all Gaussian components together to form a pool which is shared among HMM states. This approach is called tied-mixture approach. In a tied-mixture system, only the mixture component weights are state-specific and they can smoothed by interpolating with context dependent models.

Recently, another approach called decision tree state tying has been used to improve the trainability of speech recognition systems and to strike a better balance between the level of detail of the phonetic models (e.g., the number of parameters in the system) and the ability to accurately estimate those parameters from the available training data. Context modeling based on decision tree state tying approach has become increasingly popular for modeling speech variations in LVCSR systems. In the conventional framework, the stochastic classifier for each tied state is trained using the Baum-Welch algorithm with the training data corresponding to the specific tied state. However, the context dependent classifiers trained using this conventional method are not very reliable because the training data corresponding to each tied state is still limited and model parameters can be easily affected by undesired sources of information such speaker and channel information contained in the training data.

BRIEF DESCRIPTION OF THE DRAWINGS

The features of the present invention will be more fully understood by reference to the accompanying drawings, in which.

DETAILED DESCRIPTION

Figure 1:
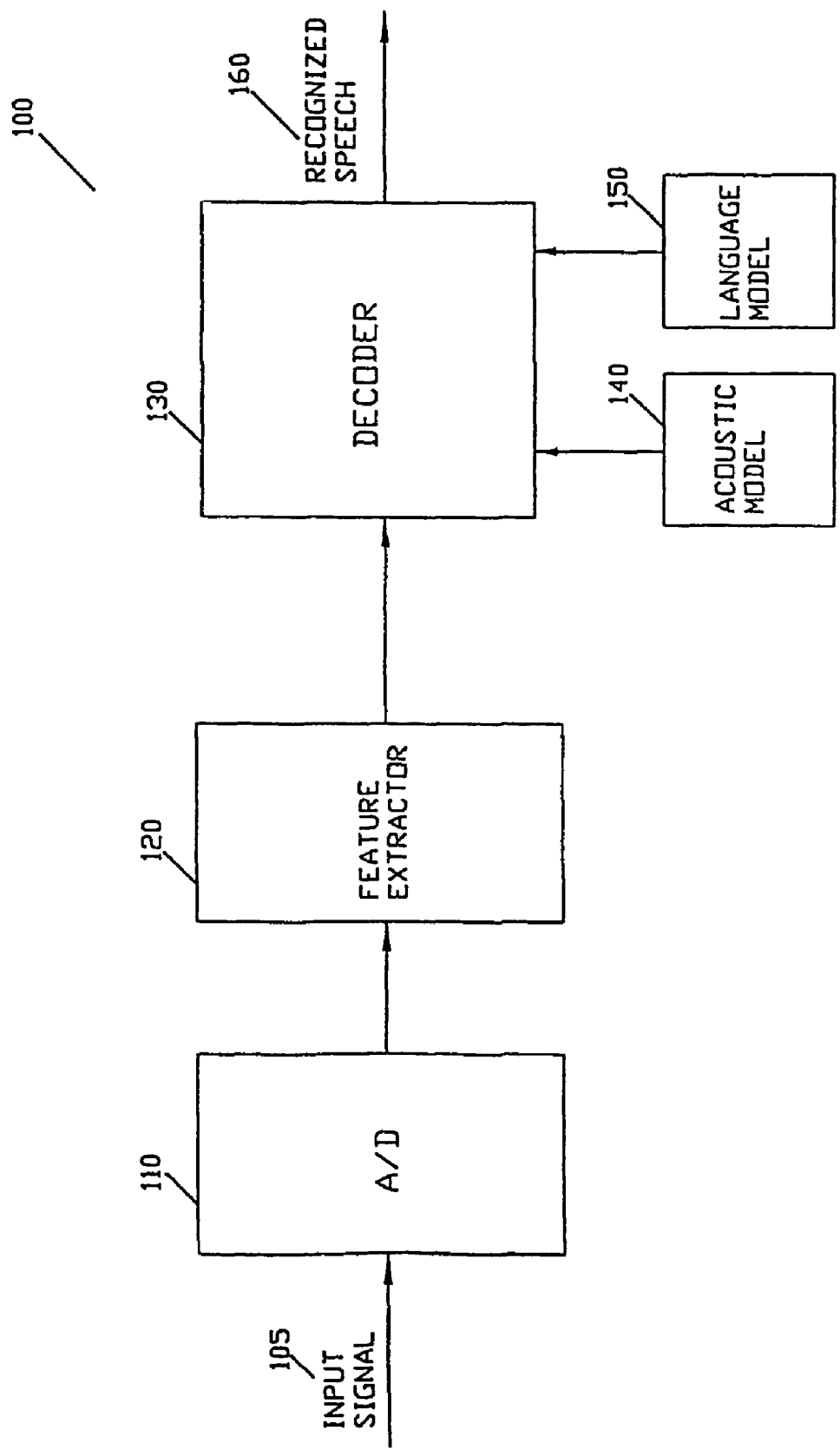
FIG. 1 is a block diagram of one embodiment of a speech recognition system according to the teachings of the present invention.

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, system, and machine-readable medium for building context dependent models for a speech recognition system using a context adaptation approach. In one embodiment, a set of multiple mixture monophone models are created and trained to generate multiple mixture context independent models. A set of single mixture triphone models are also created and trained to generate context dependent models having a set of tied states. The parameters of the context dependent models are then estimated using a data dependent maximum a posteriori (MAP) adaptation method in which the parameters of the tied states of the context dependent models are derived by adapting corresponding parameters of the context independent models through MAP adaptation method using the corresponding training data associated with the respective tied states.

In one embodiment, a set of single mixture monophone models is used to generate the multiple mixture monophone models. The single mixture models are split up and the corresponding model parameters are re-estimated to increase the number of mixtures. The split up and re-estimating process is repeated several times to obtain the multiple mixture context independent models. In one embodiment, after the single mixture triphone models have been created and trained, a decision tree is constructed for each state of each center phone and the corresponding context dependent states of each respective center phone are clustered into corresponding groups using a decision tree algorithm to obtain a set of tied states. The parameters of the tied states are then derived based upon the parameters associated with the context independent models and the training data associated with the specific tied states of the context dependent models. In one embodiment, the parameters of the tied states are derived by adapting the parameters of the context independent models by MAP adaptation method using the training data associated with the respective tied states. In one embodiment, new sufficient statistic estimates associated with the parameters of the context independent models are computed first and then combined with old sufficient statistic estimates of the corresponding parameters using a data-dependent mixing coefficient. In one embodiment, the data dependent mixing coefficient is designed so that mixtures with high counts of data from the context dependent tied states rely more on the new sufficient statistic estimates for final parameter estimation and the mixtures with low counts of data from the context dependent tied states rely more on the old sufficient statistic estimates for final parameter estimation.

The teachings of the present invention are applicable to any method, apparatus, and system for speech recognition that employs state tying in building context dependent models. However, the present invention is not limited to state tying context modeling and can be applied to other types of acoustic modeling in speech recognition systems. In addition, the present invention can also be applied to data modeling in other fields or disciplines including, but not limited to, image processing, signal processing, geometric modeling, computer-aided-design (CAD), computer-aided-manufacturing (CAM), etc.

FIG. 1 illustrates a block diagram of one embodiment of a speech recognition system 100 according to the teachings of the present invention. The system 100, as shown in FIG. 1, includes an analog to digital converter (A/D) 110, a feature extractor or spectral analysis unit 120, a decoder 130, an acoustic model 140, and a language model 150. An input signal 105 representing the input speech is first digitized using the A/D 110. The digital signal is then sliced up into frames typically of 10, 15, or 20 ms. Each frame of the signal is then converted into a corresponding feature vector which is used to characterize the spectral properties of the input signal. In the present embodiment, the feature vector is multi-dimensional and has a plurality of feature components. In one embodiment, the feature components include 12 MFCC components, 12 delta MFCCs, and 12 delta-delta MFCCs. As such the feature vectors have 36 dimensions. The feature vectors generated by the feature extractor unit 120 are then inputted into the decoder 130 which determines the sentence or sequence of words that has the highest probability given the acoustic events characterized by the feature vectors, based upon the acoustic model 140 and the language model 150. The acoustic model 140, in one embodiment, includes a set of context dependent models having a set of tied states clustered based on a decision tree clustering algorithm. In one embodiment, the parameters of the context dependent models are estimated using a data dependent MAP adaptation method in which the tied states of the context dependent models are derived by adapting the parameters of previously trained context independent models through MAP adaptation method using the training data associated with the respective tied states. The acoustic model 140 and the construction of the context dependent models are described in greater detail below.

Figure 2:
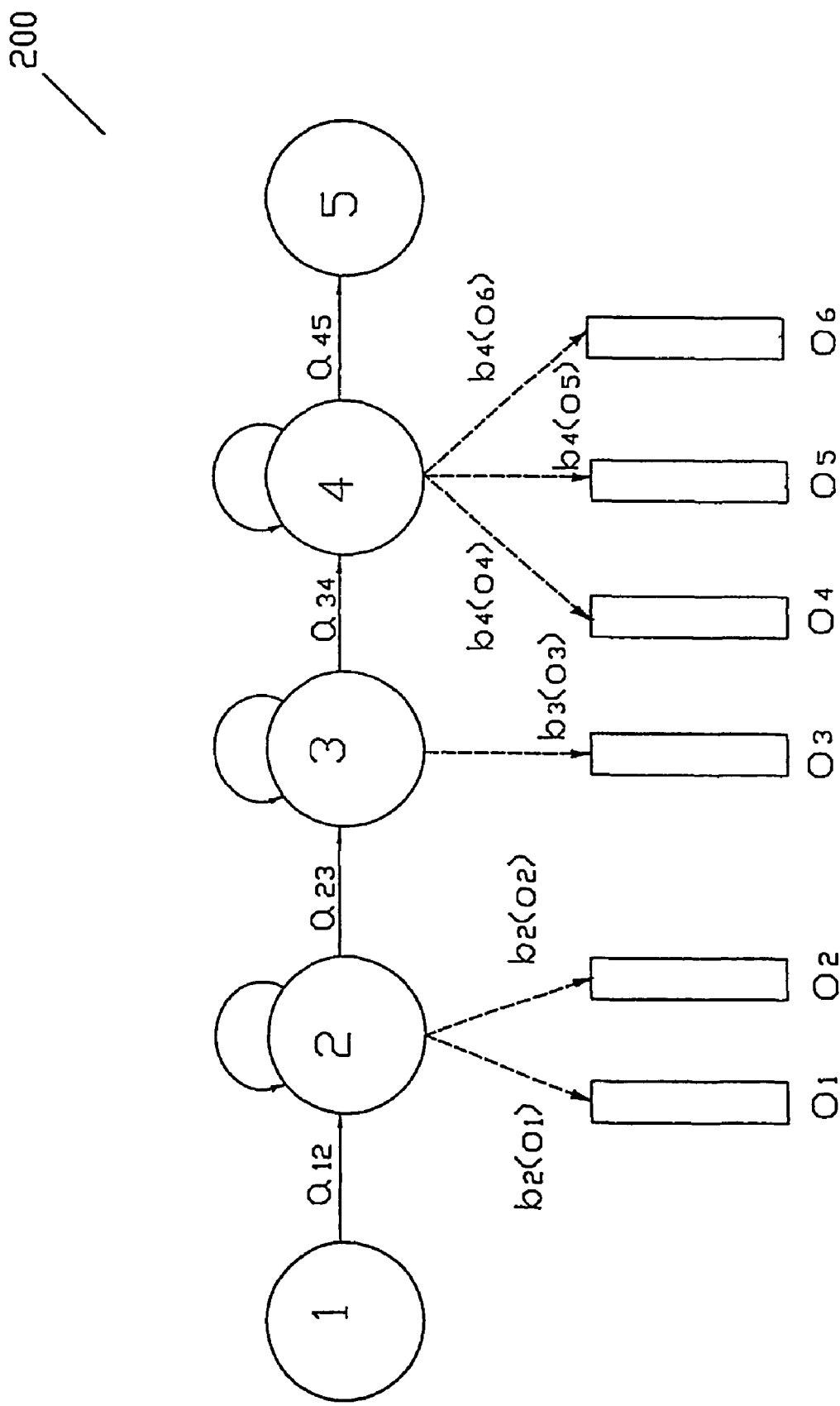
FIG. 2 is a diagram illustrating an HMM-based phone model.

FIG. 2 illustrates a diagram of one embodiment of an HMM-based phone model structure used in the acoustic model 140 to model a phonetic unit (e.g., a phoneme or a subword unit, etc.). Each individual phonetic unit is represented or modeled by a corresponding HMM. As shown in FIG. 2, an HMM has a set of sequence of states (1-5) that are connected by a set of transition probabilities $(a_{12}, a_{23}, a_{34}, a_{45})$, and a set of observation probabilities or likelihoods $(b_2(o_1, b_2(o_2), b_3(o_3), b_4(o_4), b_4(o_5), b_4(o_6))$. Each transition probability $a_{ij}$ represents the probability of transitioning from a state i to a state j. Each observation probability or distribution $b_i(o_j)$ represents the probability of an observation vector $o_j$ being generated from a state i. Thus, the transition probabilities model the durational variability in speech and the output probabilities model the spectral variability. Accordingly, the set of states, the set of transition probabilities and the set of output probabilities are the parameters that are used to define an HMM. The HMM shown in FIG. 2 has a left-right topology. In many modern speech recognition systems, each state output distribution or observation probability function is modeled by a multivariate mixture Gaussian as follows:

$$b_j(o_i) = \sum_{k=1}^{M} c_{jk} N(o_i, m_{jk}, V_{jk})$$

where $c_{jk}$ is the weight of mixture component k in state j and $N(o_i, m_{jk}, V_{jk})$ denotes a multivariate Gaussian of mean $m_{jk}$ and covariance $V_{jk}$ for the kth mixture component in state j. As discussed above, the use of continuous density HMMs for the acoustic models results in a very large number of model parameters to train with insufficient training data. Thus, various approaches, in particular the decision tree based state tying method, have been developed in recent years to strike a good balance between model complexity and available training data.

Figure 3:
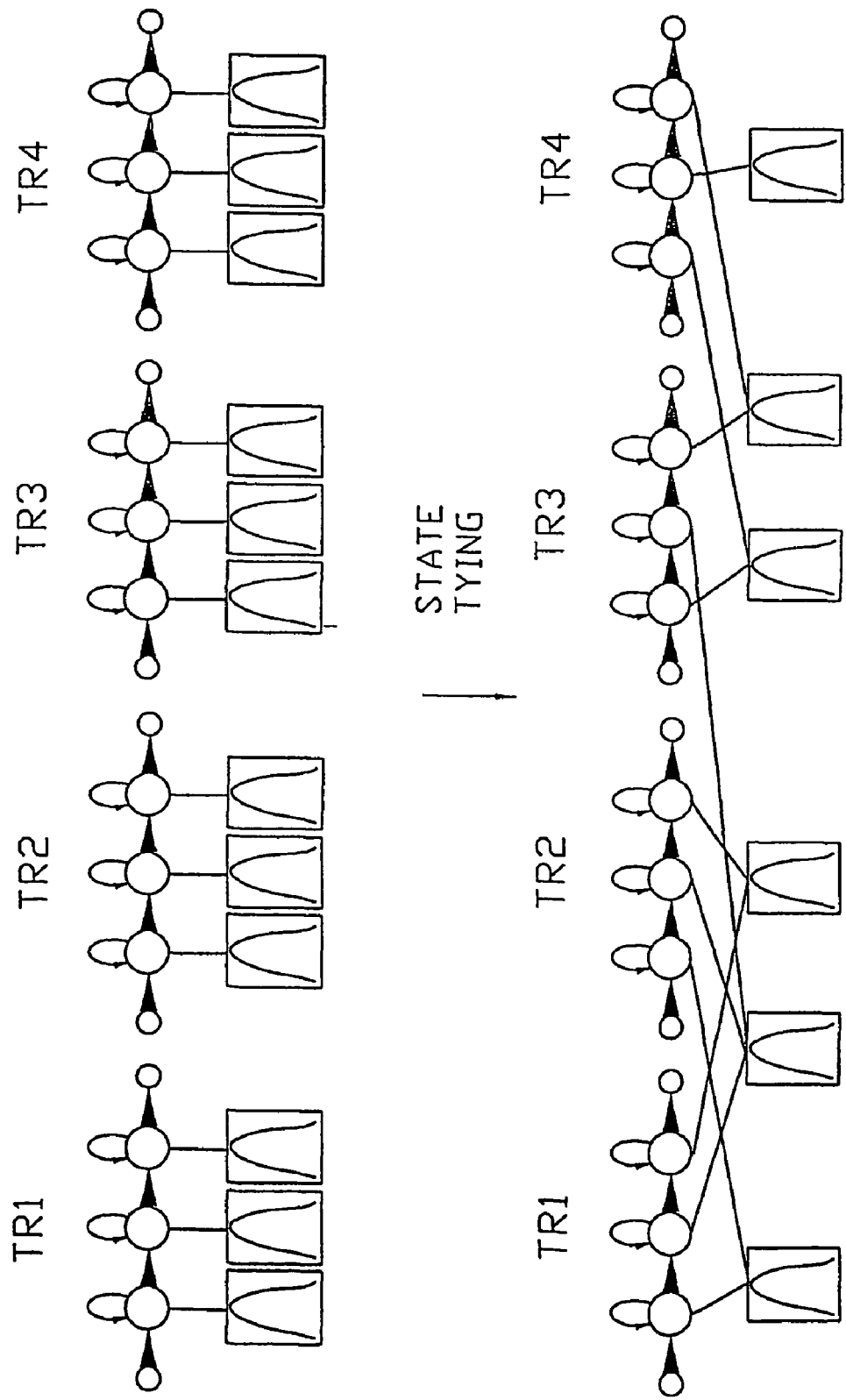
FIG. 3 is a diagram illustrating a plurality of triphones in which similar states are tied together.
Figure 4:
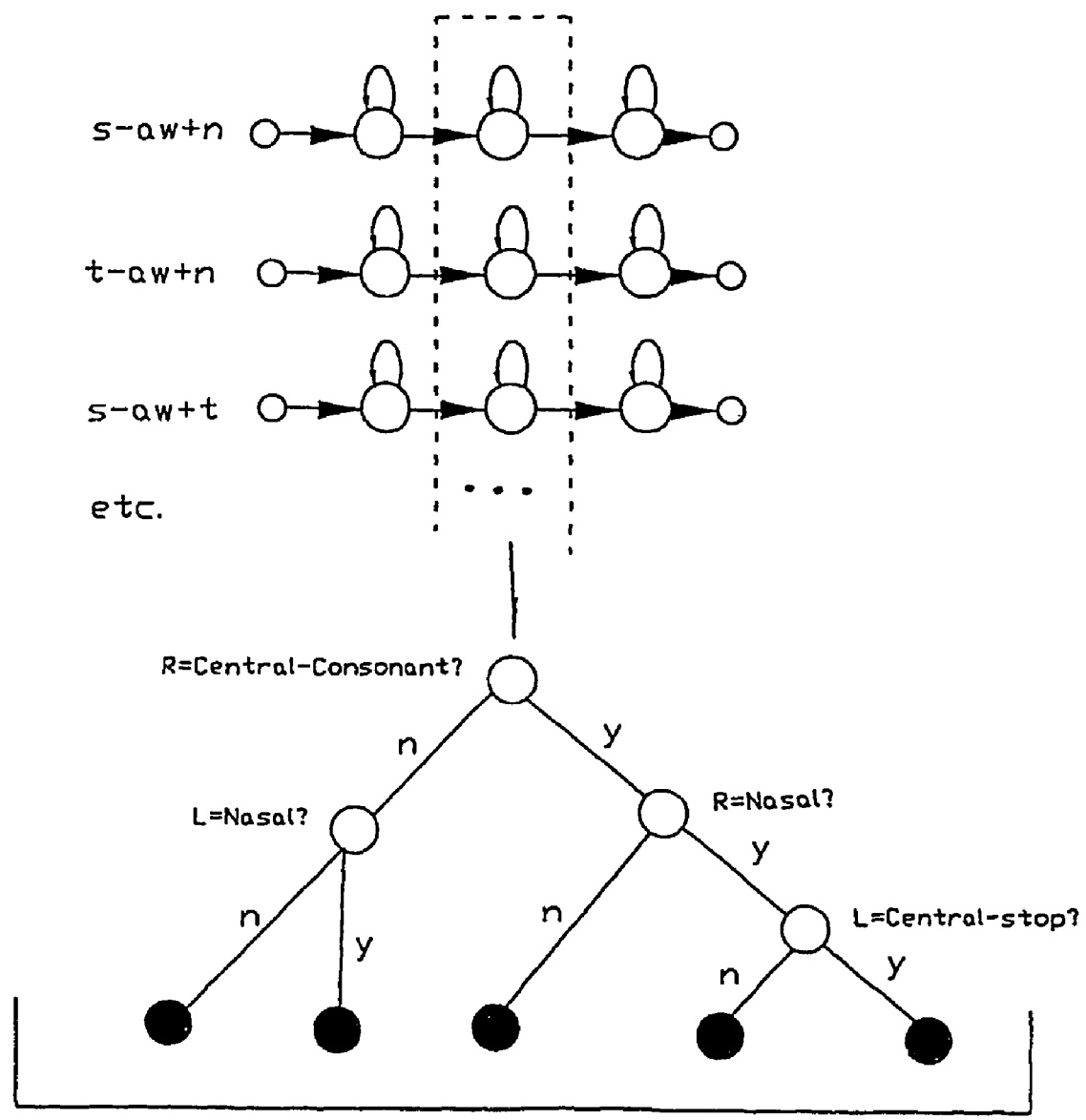
FIG. 4 illustrates an example of a decision tree that is used for state clustering or state tying.

FIG. 3 shows an example of a set of context dependent models (e.g., triphones) with similar states being tied or clustered based on decision trees. This allows the data associated with each individual state to be pooled in order to give more robust estimates for the parameters of the respective tied state. As illustrated in FIG. 4, each triphone (e.g., TR1-TR4) has its own output distribution before state tying. After state tying, several states share the same output distributions.

FIG. 4 illustrates an example of a decision tree clustering process in which all corresponding states of all allophonic variants of each basic phone (e.g. also called monophone or center phone) are clustered based on a decision tree constructed for each state of each basic phone. Each tree has a yes/no phonetic question (e.g., "Is the right context a nasal", etc.) at each node. Initially, all corresponding states of all allophonic variants of each basic phone are tied to form a single pool. Phonetic questions are then used to cluster the pool into corresponding subsets. All states in the same leaf node are then tied. For example, as shown in FIG. 4, a decision tree is used to tie the center states of all triphones that are derived from the monophone or basic phone "aw". All of the corresponding states traverse down the respective tree and end up at one of the leaf nodes depending on the answer to each of the phonetic questions.

As discussed above, in the conventional framework of context dependent model training, the stochastic classifier for each tied state is trained using Baum-Welch algorithm with the training data corresponding to the specific tied state. However, the context dependent classifiers trained using this conventional method are not very reliable because the training data corresponding to each tied state is limited and model parameters are easily affected by undesired sources of information such as speaker and channel information contained in the training data.

As described herein, the present invention provides a new framework and method for building context dependent models that are more robust and more reliable than those that are trained by the conventional method. In one embodiment, according to the teachings of the present invention, all states of each center phone of context dependent models are clustered into groups by a decision tree algorithm. The tied states of context dependent models are then derived by adapting the parameters of previously trained multiple-mixture context independent models using the training vectors corresponding to the tied state and maximum a posteriori probability (MAP) method. In one embodiment, a set of multiple mixture monophone models are trained to generate the multiple mixture context independent models. A set of single mixture triphone models are also crated and trained to generate an initial set of untied context dependent models. Context dependent states of the context dependent models are then clustered into groups using a decision tree clustering algorithm to generate a set of tied states for the context dependent models. After state tying of the context dependent models, the parameters of the tied states are then estimated by adapting the parameters of the context independent models through MAP method using training data corresponding to the tied states. In this new framework according to the teachings of the present invention, the multiple mixture context independent models cover the space of broader speaker and environment classes of speech signal. The adaptation using MAP method is considered as the context dependent tuning of those speaker and environment classes observed in different contexts of training speech. Mixture parameters for those speaker and environment classes not observed in the training speech of a specific tied state can be copied from the context independent model. The construction and training of context dependent models according to the teachings of the present invention are described in more details below.

In one embodiment, the construction and training process of context dependent models according to the present invention includes the following phases: a context independent model training phase, a triphone model training and decision tree based clustering phase, and a context dependent model training and adaptation phase. Each phase of the process is described in detail below.

Context Independent Training:

In this phase, multiple-mixture monophone models are trained as the context independent models. The mixture splitting up process is the same as a baseline system. It is well known that the speech signal contains information about various sources. Speech recognition systems need to focus on linguistic information while ignoring other undesired sources of information such as speaker and channel information. One way to achieve this is by training stochastic classifiers with data that contain the various sources of information. For example speaker independence can be achieved in a speech recognition system by training the system using speech data collected from multiple speakers. Multiple mixture context independent models are constructed to cover the space of broader speaker and environment classes of speech signal. High prediction and classification power can be obtained with the context dependent models adapted from these multiple mixture context independent models as described below. In one embodiment, the context independent models (e.g., monophone models) are built using Baum-Welch algorithm as in the conventional framework except that multiple mixture monophone models are built instead of single mixture models in the convention framework. To construct multiple mixture context independent models as background models for context adaptation, single mixture models are split up and the model parameters are re-estimated. After several splitting and re-estimating iterations, multiple mixture context independent models are obtained. In various experiments according to teachings of the present invention various numbers of mixtures per state were tried (e.g., 24, 32, 48, 56 mixtures per state, etc.).

Triphone Model Training and Decision Tree Based State Clustering:

Before decision tree clustering, a set of single mixture triphone models are constructed and trained. In one embodiment, the single mixture triphone models are built as in the conventional framework. After the initial triphone models are created and trained, one decision tree is then constructed for each state of each center phone and all the context dependent states of the respective phone are clustered into groups by the decision tree algorithm. The node splitting and model selection of decision tree based state tying is a data-driven procedure. It integrates both a priori phonetic knowledge and acoustics similarities derived from training data. However, because linguistic information and other unwanted information are bound together in an unknown way in the current spectral-based features, training data corresponding to each tied state may not only contain similar acoustic information but also contain similar speaker and channel information. In the conventional framework, while the parameters of the context dependent model are estimated only with these biased data using Baum-Welch algorithm, the context dependent models will not be reliable and robust.

Context Dependent Model Training Using Data-dependent Adaptation Coefficient:

In one embodiment, to make the context dependent models more robust and reliable, the tied states of context dependent models are derived by adapting the parameters of the context independent model through MAP method using the training data corresponding to the tied states. In one embodiment, the adaptation process is a two-part estimation process. In the first part, sufficient statistic estimates for the weight, mean, and covariance of the Gaussian mixtures are computed. This part is identical to the first step of Baum-Welch algorithm. In the second part, the new sufficient statistic estimates are then combined with the old sufficient statistics from the context independent parameters using a data-dependent mixing coefficient. In one embodiment, the data-dependent mixing coefficient is designed so that mixtures with high counts of data from the context dependent clustered state rely more on the new sufficient statistics for final parameter estimation and mixtures with low counts of data from context dependent clustered state rely more on the old sufficient statistics for final parameter estimation.

For a given context dependent model and the corresponding training vectors, $X=\{x_1, \ldots, x_\tau\}$, the probabilistic alignment of the training vectors into the mixture components is determined. That is, for a mixture i in this model, the probabilistic alignment is computed as follow:

$$Pr(i|x_i) = \frac{w_i p_i(x_i)}{\sum_{j=1}^{M} w_j p_j(x_i)}$$

where $w_i$ is the weight of ith mixture and $p_i(x)$ is the Gaussian densities corresponding to the ith mixture.

$Pr(i|x_i)$ and $x_i$ are then used to compute the sufficient statistics for the weight, mean, and variance parameters as shown below:

$$n_i = \sum_{t=1}^{T} Pr(i|x_i);$$

-continued $$E_i(x) = \frac{1}{n_i} \sum_{t=1}^{T} Pr(i|x_i)x_t;$$

$$E_i(x^2) = \frac{1}{n_i} \sum_{t=1}^{T} Pr(i|x_i)x_t^2;$$

For each mixture i of the context dependent cluster state j, the adaptation of sufficient statistics from the training data can be written as follows:

$$\overline{w_i} = [\alpha_i^w n_i/T + (1-\alpha_i^w)w_i]\gamma \quad (1)$$

$$\overline{\mu_i} = \alpha_i^m E_i(x) + (1-\alpha_i^m)\mu_i \quad (2)$$

$$\overline{\sigma_i^2} = \alpha_i^v E_i(x^2) + (1-\alpha_i^v)(\sigma_i^2 + \mu_i^2) - \overline{\mu_i}^2 \quad (3)$$

The adaptation coefficients controlling the balance between old and new estimates are $\{\alpha_i^v, \alpha_i^m, \alpha_i^v\}$ for the weights, means and variances, respectively. The scale factor, $\gamma$, is computed over all adapted mixture weights to ensure they sum to unity.

For each mixture i of the context dependent cluster state j and each parameter, a data-dependent adaptation coefficient $\alpha_i^\rho, \rho \lfloor \{w,m,v\}$, is used in the above equations. This is defined as follows:

$$\alpha_i^p = \frac{n_i}{n_i + r^p}$$

where $r^\rho$ is a fixed relevance factor for parameter $\rho$.

Using a data-dependent adaptation coefficient allows a mixture-dependent adaptation of parameters. If a mixture component has a low probabilistic count, $n_i$, of new data, then $\alpha_i^\rho \blacklozenge 0$ causing the deemphasis of the new (potentially under trained) parameters and the emphasis of the old (better trained) parameters. For mixture components with high probabilistic counts, $\alpha_i^\rho \blacklozenge 1$, causing the use of the new context-dependent parameters. In one embodiment, the relevance factor is a way of controlling how much new data should be observed in a mixture before the new parameters are used to replace the old parameters. This approach should thus be more robust given limited training data.

The use of parameter-dependent relevance factors (and hence parameter-dependent adaptation coefficients $\alpha_i^\rho$) can further allow for the tuning of different adaptation rates for the weights, means, and variances. In one embodiment, a single adaptation coefficient is used for all parameters $(\alpha_i^w = \alpha_i^m = \alpha_i^v = n_i/(n_i+r))$ with the same relevance factor. In this case, for mixture component with probabilistic counts larger than this relevance factor, the new parameters are emphasized, otherwise the old parameters are emphasized.

Since the adaptation is data dependent, not all Gaussians in the context independent models are adapted during the context dependent model training phase. In various experiments according to the teachings of the present invention, there are usually about 1/10 of the Gaussian mixtures of the final context dependent models that are not updated from the context independent models and the parameters of these mixtures are merely copied from the context independent models. This factor can be used to reduce model storage requirements.

In this new framework of building context dependent models, each tied state can be considered as a context class. Accordingly, every context class contains its own context information. To improve the prediction power of the context dependent models, the distribution parameters of each classifier are estimated not only from its own training data but also from the context independent models. Thus the context adaptation method described herein can be considered as a smooth technique.

Figure 5:
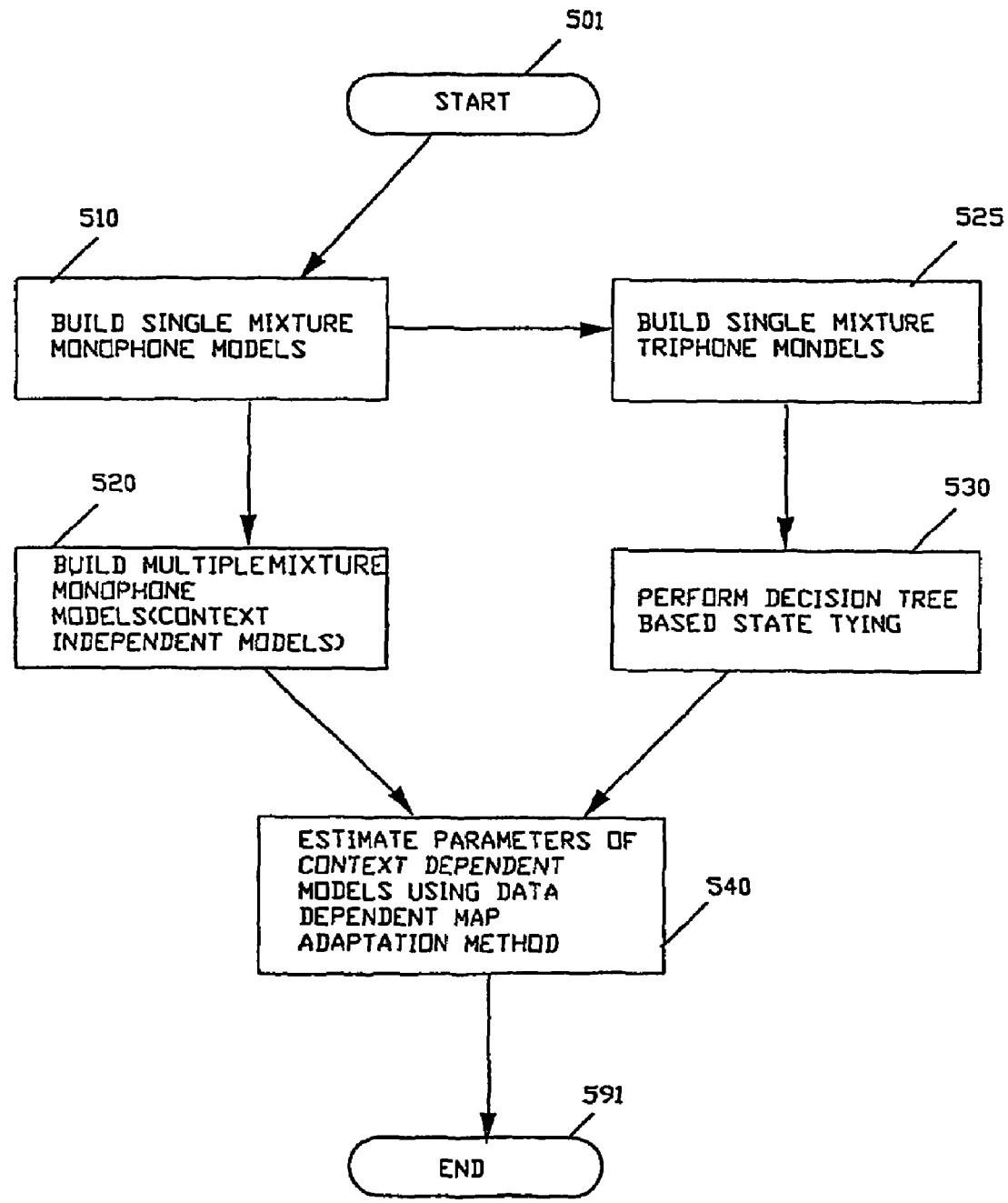
FIG. 5 shows a flow diagram of one embodiment of a method according to the teachings of the present invention.

FIG. 5 illustrates a flow diagram of one embodiment of a method according to the teachings of the present invention. At block 510, single mixture monophone models are built. At block 520, multiple mixture monophone models (context independent models) are built based on the single mixture monophone models. At block 525, single mixture triphone models are built as the initial context dependent models. At block 530, decision tree based state tying is performed to create tied states for the context dependent models. At block 540, parameters of the context dependent models are estimated using a data dependent MAP adaptation method.

Figure 6:
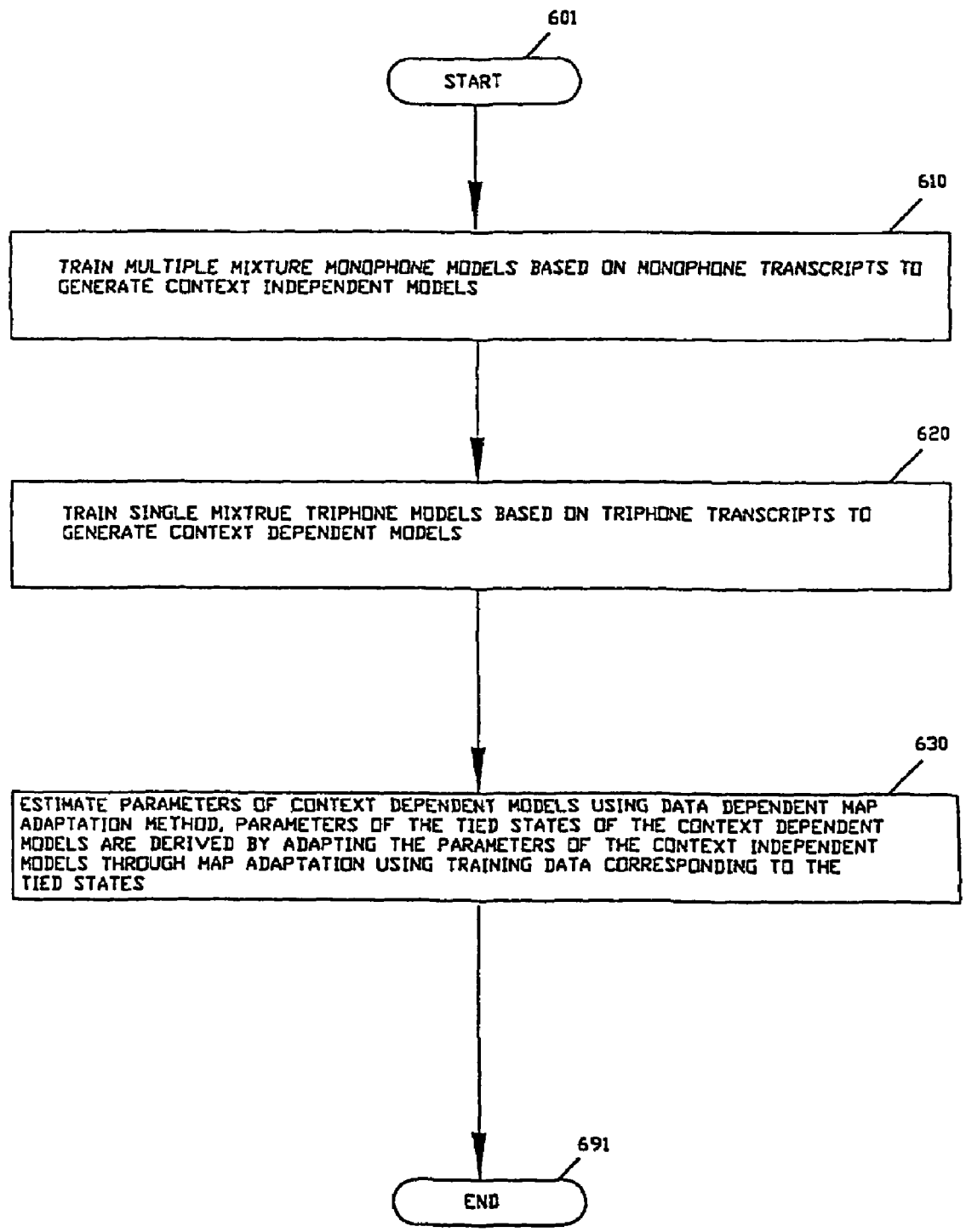
FIG. 6 shows a flow diagram of one embodiment of a method according to the teachings of the present invention.

FIG. 6 shows a flow diagram of a method according to the teachings of the present invention. At block 610, a set of multiple mixture monophone models is trained based on a set of monophone transcripts to generate a set of multiple mixture context independent models. At block 620, a set of single mixture monophone models is trained based on a set of triphone transcripts to generate a set of context dependent models. At block 630, parameters of the context dependent models are estimated using a data dependent MAP adaptation method in which parameters of the tied states of the context dependent models are derived by adapting the corresponding parameters of the context independent models through MAP adaptation method using the training data corresponding to the respective tied states.

The invention has been described in conjunction with the preferred embodiment. It is evident that numerous alternatives, modifications, variations and uses will be apparent to those skilled in the art in light of the foregoing description.

The invention also covers a machine-readable medium comprising instructions which, when executed a machine, causes the machine to perform operations that are described in previous sections of this Specification in detail.

What is claimed is:

1. A method comprising:
    receiving, by an analog-to-digital converter, an input signal representing input speech;
    converting the input speech to digital input speech by the analog-to-digital converter;
    generating a set of multiple-mixture monophone models via a set of single-mixture monophone models;
    training the set of multiple-mixture monophone models with a set of single-mixture monophone transcripts to generate a set of multiple-mixture context independent models;
    generating a set of single-mixture triphone models;
    training the set of single-mixture triphone models with a set of triphone transcripts to generate a set of context dependent models;
    estimating parameters of the set of context dependent models for the digitized input speech via a data dependent maximum a posteriori (MAP) adaptation method, wherein parameters of tied states of the set of context dependent models are derived by adapting corresponding parameters of the set of multiple-mixture context independent models through the MAP adaptation method via training data associated with the corresponding tied states; and
    outputting recognized speech, of the input speech, based on the estimated parameters.

2. The method of claim 1, wherein training the set of multiple-mixture monophone models includes:

constructing the set of single-mixture monophone models based on the set of monophone transcripts; and estimating parameters of the set of single-mixture monophone models with a Baum-Welch method.

3. The method of claim 2, wherein the set of single-mixture monophone models are split up and the corresponding parameters are re-estimated iteratively for a predetermined number of iterations to obtain the set of multiple-mixture context independent models.

4. The method of claim 1, wherein training the set of triphone models further including:

constructing a decision tree for each state of each center phone of the set of single-mixture triphone models; and clustering context dependent states of each respective center phone in corresponding groups via a decision tree algorithm to obtain a set of corresponding tied states, each tied state of the set of corresponding tied states having a corresponding distribution of training data.

5. The method of claim 4, wherein estimating the parameters includes:

deriving parameters of the tied states of the set of context dependent models based on the parameters associated with the set of multiple-mixture context independent models and the training data associated with the tied states of the set of context dependent models.

6. The method of claim 5, wherein deriving the parameters of the tied states of the set of context dependent models includes:

adapting the parameters of the set of multiple-mixture context independent models by the MAP adaptation method based at least in part on the training data associated with the tied states of the set of context dependent models.

7. The method of claim 6 wherein adapting the parameters includes:

computing new statistic estimates associated with the parameters of the set of multiple-mixture context independent models; and combining the new statistic estimates with old statistic estimates from the parameters of the set of multiple-mixture context independent models via a data-dependent mixing coefficient.

8. The method of claim 7 wherein, based on the data-dependent mixing coefficient, mixtures of high counts of data from the tied states of the set of context dependent models rely on the new statistic estimates for final parameter estimation.

9. The method of claim 7 wherein, based on the data-dependent mixing coefficient, mixtures of low counts of data from the tied states of the set of context dependent models rely on the old statistic estimates for final parameter estimation.

10. An acoustic model comprising:

a set of context dependent models having a set of tied states whose parameters are estimated by a data dependent maximum a posteriori (MAP) adaptation method, wherein the parameters of the tied states are derived based on corresponding parameters of a set of multiple-mixture context independent models via training data associated with the respective tied states, the set of multiple-mixture context independent models created via a set of single-mixture monophone models, and wherein the acoustic model is coupled with a decoder unit that receives digital input signal, from an analog to digital converter, and generates recognizable speech of the digital input signal as output based on the acoustic model.

11. The acoustic model of claim 10, wherein the set of multiple-mixture context independent models is generated by a set of multiple-mixture monophone models which is trained via a set of monophone transcripts.

12. The acoustic model of claim 10, wherein the set of single-mixture monophone models are split up and re-estimated iteratively for a predetermined number of iterations to obtain a set of multiple-mixture monophone models.

13. The acoustic model of claim 10 wherein, the set of context dependent models is generated by a set of single-mixture triphone models which is trained via a set of triphone transcripts.

14. The acoustic model of claim 13, wherein the tied states are obtained via a decision tree which is constructed for each state of each center phone of the set of single-mixture monophone models.

15. The acoustic model of claim 14, wherein the parameters of the tied states are derived by adapting the parameters of the set of multiple-mixture context independent models by the MAP adaptation method via the training data associated with the tied states of the set of context dependent models.

16. The acoustic model of claim 15, further comprising new statistic estimates associated with the parameters of the set of multiple-mixture context independent models which are computed and combined with old statistic estimates from the parameters of the set of multiple-mixture context independent models via a data dependent mixing coefficient.

17. The acoustic model of claim 16 wherein, based on the data dependent mixing coefficient, mixtures with high counts of data from the tied states of the set of context dependent models rely on the new statistic estimates for final parameter estimation.

18. The acoustic model of claim 16 wherein, based on the data dependent mixing coefficient, mixtures with low counts of data from the tied states of the set of context dependent models rely on the old statistic estimates for final parameter estimation.

19. A system comprising:

an analog-to-digital converter for receiving an input signal representing input speech, the analog-to-digital converter to convert the input speech to digital input speech;

a feature extraction unit coupled with the analog-to-digital converter to convert the digital input speech into a set of feature vectors, each feature vector representing a corresponding frame of the digital input signal;

an acoustic model coupled with the feature extraction unit, the acoustic model including a set of context dependent models having a set of tied states whose parameters are estimated via a data dependent maximum a posteriori (MAP) adaptation methods, wherein parameters of the tied states are derived based on corresponding parameters of a set of multiple-mixture context independent models via training data associated with the respective tied states, the set of multiple-mixture monophone context independent models generated via a set of single-mixture monophone models; and a decoder coupled with the feature extraction unit and the acoustic model, the decoder to output recognized speech from the input speech based on the feature vectors and the acoustic model.

20. The system of claim 19 wherein the acoustic model further includes a set of multiple-mixture monophone models trained via a set of monophone transcripts to generate the set of multiple-mixture monophone context independent models, and wherein the single-mixture monophone models are split up and re-estimated iteratively for a predetermined number of iterations to obtain the set of multiple-mixture monophone models.

21. The system of claim 19, wherein the acoustic model further includes a set of single-mixture triphone models trained via a set of triphone transcripts to generate the set of context dependent models.

22. The system of claim 21, wherein the parameters of the tied states are derived by adapting the parameters of the set of multiple-mixture monophone context independent models generated by the MAP adaptation method via the training data associated with the tied states of the set of context dependent models.

23. The system of claim 21, wherein the acoustic model further includes a data dependent mixing coefficient for computing new statistic estimates associated with the parameters of the set of multiple-mixture monophone context independent models, the new statistic estimates are combined with old statistic estimates from the parameters of the set of context independent models.

24. The system of claim 23, wherein based on the data dependent mixing coefficient, mixtures with high counts of data from the set of tied states of the set of context dependent models rely on the new statistics estimates for final parameter estimation.

25. The system of claim 24, wherein based on the data dependent mixing coefficient, mixtures with low counts of data from the set of tied states of the set of context dependent models rely on the old statistic estimates for final parameter estimation.

26. A machine-readable medium comprising instructions which, when executed by a machine, cause the machine to perform operations including:
receiving, by an analog-to-digital converter, an input signal representing input speech;
converting the input speech to digital input speech by the analog-to-digital converter;
generating a set of multiple-mixture monophone models via a set of single-mixture monophone models;
training the set of multiple-mixture monophone models with a set of single-mixture monophone transcripts to generate a set of multiple-mixture context independent models;
generating a set of single-mixture triphone models;
training the set of single-mixture triphone models with a set of triphone transcripts to generate a set of context dependent models;
estimating parameters, for the digital input speech, of the set of context dependent models via a data dependent maximum a posteriori (MAP) adaptation method, wherein parameters of tied states of the set of context dependent models are derived by adapting corresponding parameters of the set of multiple-mixture context independent models through the MAP adaptation method via training data associated with the corresponding tied states; and
outputting recognized speech, of the input speech, based on the estimated parameters.

27. The machine-readable medium of claim 26, wherein training the set of triphone models further includes:
constructing a decision tree for each state of each center phone of the set of single-mixture triphone models; and
clustering context dependent states of each respective center phone in corresponding groups via a decision tree algorithm to obtain a set of corresponding tied states, each tied state of the set of corresponding tied states having a corresponding distribution of training data.

28. The machine-readable medium of claim 27 wherein estimating parameters includes:
deriving parameters of the set of corresponding tied states of the set of context dependent models is based on the parameters associated with the set of multiple-mixture context independent models and the training data associated with the set of corresponding tied states of the set of context dependent models.

29. The machine-readable medium of claim 28 wherein deriving the parameters of the set of corresponding tied states of the context dependent models includes:
adapting the parameters of the set of multiple-mixture context independent models by the MAP adaptation method via the training data associated with the set of corresponding tied states of the set of context dependent models, including:
computing new statistic estimates associated with the parameters of the set of multiple-mixture context independent models; and
combining the new statistic estimates with old statistic estimates from the parameters of the set of multiple-mixture context independent models via a data-dependent mixing coefficient.

30. The machine-readable medium of claim 29 wherein, based on the data-dependent mixing coefficient, mixtures of high counts of data from the set of corresponding tied states of the set of context dependent models rely on the new statistic estimates for final parameter estimations, and wherein mixtures of low counts of data from the set of corresponding tied states of the set of context dependent models rely on the old statistic estimates for final parameter estimation.

* * * * *